United States Patent [19]

Hastings

[11] Patent Number: 5,457,624

[45] Date of Patent: Oct. 10, 1995

[54] EFFICIENT SWITCHED MODE POWER CONVERTER CIRCUIT AND METHOD

[75] Inventor: Roy A. Hastings, Allen, Tex.

[73] Assignee: Texas Instruments Incorporated, Dallas, Tex.

[21] Appl. No.: 259,404

[22] Filed: Jun. 13, 1994

[51] Int. Cl.$^6$ .................................................. H02M 7/217
[52] U.S. Cl. ............................................ 363/127; 363/89
[58] Field of Search ................................. 363/21, 37, 45, 363/46, 67, 68, 81, 82, 89, 125, 127; 323/282, 284, 285

[56] References Cited

U.S. PATENT DOCUMENTS

| | | | |
|---|---|---|---|
| 4,716,514 | 12/1987 | Patel | 363/127 |
| 4,870,555 | 9/1989 | White | 363/21 |
| 4,922,404 | 5/1990 | Ludwig et al. | 363/89 |
| 5,303,138 | 4/1994 | Rozman | 363/127 |
| 5,336,985 | 8/1994 | McKenzie | 323/282 |

OTHER PUBLICATIONS

Gold, Martin, *Maxim takes on portables*, Periodical unknown, date unknown.
Author unknown, *High Efficiency Synchronous Stepdown Switching Regulator*, Linear Technology, Nov. 1992.
Locascio, James J. and Cho, William, *A New PWM Controller IC For Battery Powered Systems*, Micro Linear Corporation, 92 HFPC, May 1993 Proceedings.
Author unknown, *Battery Power Control IC*, Micro Linear Advance Information, Mar. 1993.
Huffman, Brian and Wilcox, Milt, *New Synchronous Stepdown Switching Regulators Achieve 95 Efficiency*—Design Note 68, Linear Technology Design Notes, 1993.
Kerridge, Brian *Battery Power Breeds Efficient Regulators*, EDN–Technology Update, pp. 103–108, Mar. 18, 1993.
Author unknown, *Half Bridge N-channel Power MOSFET Driver*, LT1158, Linear Technology Corporation, pp. 1–20, 1992.
Author unknown, *Subnotebook Computer Power Controller*, Advance Information, Maxim Integrated Products, pp. 1–12, 1993.
Author unknown, *Notebook Computer Power Supplies*, Advance Information, Maxim Integrated Products, pp. 1–8, 1993.
Author Unknown, *5.6.1 Using Power MOSFETs as High–Efficiency Synchronous and Bridge Rectifiers in Swtich–Mode Power Supplies (TA83–1)*, Siliconix MosPower Applications, Editor in Chief Rudy Severns, ISBN 0–930519–00–0, 1984.
Robert Blattney, *High–Efficiency Buck Converter for Notebook Computers*, AN92–4, Siliconix, Date Unknown.
Author Unknown, *Synchronous Buck Converter Controller*, Si9150CY, Siliconix, Date Unknown.

*Primary Examiner*—Steven L. Stephan
*Assistant Examiner*—Matthew V. Nguyen
*Attorney, Agent, or Firm*—Mark E. Courtney; W. James Brady, III; Richard L. Donaldson

[57] ABSTRACT

A method and apparatus are disclosed for sustaining efficiency of switched mode power converters over wide load ranges. The method and apparatus can be used with any switched mode power converter having at least one synchronous rectifier ($Q_2$) capable of being enabled or disabled and coupled, either by direct connection or otherwise, to an inductor ($L_1$) and a diode rectifier ($D_1$), to provide a current path for the inductor current when the synchronous rectifier ($Q_2$) is disabled. The power converter is initialized by enabling the synchronous rectifier ($Q_2$). Occasionally, the synchronous rectifier ($Q_2$) is disabled, and the energy stored in the inductor ($L_1$) is detected by sensing a voltage representative of the energy stored in the inductor ($L_1$). A power level signal is then generated indicating whether the power converter is operating above a selected threshold. The power converter is configured in response to the power level signal by enabling the synchronous rectifier ($Q_2$) if the power level is above the threshold or by disabling the synchronous rectifier ($Q_2$) otherwise. The steps of disabling, detecting, generating, and configuring are repeated.

20 Claims, 4 Drawing Sheets

EFFICIENT SWITCHED MODE POWER CONVERTER CIRCUIT AND METHOD

TECHNICAL FIELD OF THE INVENTION

This invention relates generally to switched mode power converter circuits, and more particularly, to a method and apparatus for improving the efficiency of a switched mode power converter over wide load ranges.

BACKGROUND OF THE INVENTION

A switched mode power converter is a multi-port network having at least two ports, at least one of which is an input and at least one of which is an output. Inputs absorb electrical power from an external source; outputs deliver electrical power to an external load. The converter is a network of reactive elements, switching elements and, in addition, possibly one or more transformers. The reactive elements include at least one inductor, and possibly one or more capacitors. The switching elements include at least one externally-controlled switch, such as a power transistor, and possibly one or more diode rectifiers. The externally-controlled switches are driven by a control circuit which adjusts the duty cycle of the switches and possibly the timing relationships between various switches so as to regulate the flow of electrical power through the converter. The connection of the switches is such that at least two, and possibly more, topological configurations are assumed by the network as various switches open and close. Each current path in every configuration of the network has no intentional dissipative (lossy) elements, so as to limit power dissipation to the unavoidable minimum caused by the existence of parasitic dissipative losses. Each current path therefore contains inductive reactance, which can be idealized as a lumped inductor, which limits and controls the flow of electrical current. The converter will assume each of its topological configurations in cyclical repetition, as determined by the control circuit.

A switched mode power supply can achieve greater efficiency than a linear regulated power supply because a switched mode power supply uses digital switching instead of power dissipative linear regulation. Reactive elements in a switched mode power supply store energy during the period of time when the digital switching interrupts the power flow.

A typical converter topology is a step down or buck converter. A basic buck converter comprises a capacitor connected between ground and an output terminal, an inductor connected between the output terminal and a switching node, a diode with its cathode connected to the switching node and its anode connected to ground, and a power transistor such as a p-type MOSFET. The drain of the MOSFET is connected to the switching node, the source connects to the input voltage being stepped down, and the gate is connected to a control circuit that switches the power transistor on and off at a frequency typically between 50 kHz and 150 kHz. For clarity, this power transistor can be called a converter power transistor. A feedback circuit provides feedback from the output terminal to the circuitry generating the switching signal allowing the duty cycle of the switching signal to be altered.

Switched mode power converters are classified as to their mode of operation based upon whether the inductor sees continuous or discontinuous current flow. In any given inductor, if there is no finite period of time during which the inductor current is zero, the inductor is said to be operating in continuous conduction mode, or continuous mode. In any given inductor, if there is a finite period of time during which the inductor current stays at zero, the inductor is said to be operating in discontinuous conduction mode, or discontinuous mode. In order for discontinuous conduction to occur, a blocking device must prevent reverse current flow from occurring during a phase of the converter's operation during which the first derivative of the inductor current is negative. In simple canonical converters, containing one inductor, one externally-controlled switch and one diode, the diode acts to block reverse current flow and to allow discontinuous mode operation.

A buck converter can operate in continuous mode or discontinuous mode. When the load is drawing sufficient power, the converter operates in continuous mode, and some positive current is always flowing through the inductor. However, when the power level drops below a predetermined threshold, the current through the inductor will decay to zero and will remain at zero for a finite portion of each cycle of operation. When this condition occurs, the converter is operating in discontinuous mode.

A key indication of the quality of a switched mode power converter is its power efficiency. Although an ideal converter has zero losses, real circuits exhibit numerous loss mechanisms. Power transistors contribute both static losses from the resistance between the drain and the source when the transistor is "on" or conducting, and dynamic losses caused by switching transients. Magnetic components contribute core losses and winding losses. Capacitors contribute ohmic losses due to equivalent series resistance. Diodes contribute both static losses due to the forward voltage drop and dynamic losses due to reverse recovery losses. In modern low voltage switched mode converters, the most objectionable loss is due to the forward voltage drop of the diode, which currently cannot be reduced much below 0.5 volts, even with the best Schottky barrier rectifiers.

To solve the problem of losses due to the diode, switched mode power converter designers commonly substitute a synchronous rectifier for the diode. A general definition of a synchronous rectifier is as follows: A synchronous rectifier is an externally controlled switch which is substituted for a diode rectifier in a switched mode power converter. The switch is either turned on or turned off during each phase of the converter's cycle, so that the synchronous rectifier either appears as an open or a short in each topological configuration assumed by the converter. This implies that the switch is operated in synchrony with at least one other switching element of the converter, and thus the name 'synchronous rectifier'. For example, a synchronous rectifier can be a power transistor such as a bipolar power transistor or a MOSFET power transistor. In a buck converter, the synchronous rectifier is switched on during the period of time when the converter power transistor is "off", allowing the synchronous rectifier to source the inductor current. While the converter power transistor is on, the synchronous rectifier is switched off.

A MOSFET is commonly used as a synchronous rectifier. MOSFET synchronous rectifiers are poorly adapted for use in converters that supply widely varying loads, because the MOSFET synchronous rectifier prevents the converter from entering the discontinuous mode of operation.

In a discontinuous mode of operation, there is an interval of time during which a diode would normally block reverse current to prevent back conduction. A conducting MOSFET cannot block reverse current since it conducts in both quadrant one and quadrant three. Therefore, discontinuous operation is prevented. Considerable AC currents circulate in the converter even if little or no power is delivered to the load. Therefore, a converter with MOSFET synchronous rectifiers becomes increasingly inefficient as the output power approaches zero. Circuits which employ bipolar transistors experience similar reverse conduction losses at low power levels.

One popular application for low voltage, synchronously rectified, switched mode power converters is in portable computers. Because of limited battery capacity, portable computers shut down disk drives and displays when not in use. These power conserving techniques result in very wide variations in load (as high as 1000:1). These wide load variations make discontinuous mode operation highly desirable. Because high efficiency is critical, synchronous rectification is often employed and back conduction through the synchronous rectifier at low power levels is unacceptable. Accordingly, an efficient power converter should employ a synchronous rectifier at high power levels and an ordinary rectifier, such as a diode, at low power levels. The efficiency loss due to the forward drop of the diode rectifier is more than compensated by the elimination of reverse conduction losses.

Two existing solutions are known to allow synchronous rectification in wide load power converters. First, some switched mode power converters have a mechanism to manually enable or disable the synchronous rectifier using an externally generated signal. While the synchronous rectifier is disabled, a parallel-connected diode takes over. This approach, however, requires an external circuit to detect the onset of low power operation and manually disable the synchronous rectifier. This solution thus requires additional circuit design and the additional circuitry consumes additional board space. This solution may increase the size and cost of an electronic device employing such a switched mode power converter.

A second existing solution requires one or more external current sense resistors and the onset of low power operation is detected by monitoring the voltage across these resistors to detect current variations. Although this scheme eliminates the need for an external control signal, it has two serious disadvantages. First, the current sense resistors represent unwanted dissipative elements in the power circuit, thus creating an efficiency loss that is significant at high power levels. Second, the current sense resistors are sensitive to noise that may interfere with the proper operation of the circuit. Therefore, using current sense resistors complicates board layout and may represent an unpredictable source of transient instabilities due to unexpected mode transitions. Current sense transformers can be used in place of current sense resistors, but they are relatively expensive and require one or more additional magnetic components to be added to the circuit.

SUMMARY OF THE INVENTION

In accordance with the present invention, a method is provided for sustaining efficiency over wide load ranges in a switched mode power converter. An apparatus utilizing the method is also disclosed. The method will work with any switched mode power converter having at least one synchronous rectifier capable of being enabled or disabled that is coupled to an inductor by direct connection or otherwise. The switched mode converter will also normally have a control circuit to generate a cyclical switching signal having an on-period and an off-period during each cycle, and a diode rectifier to provide a current path for the inductor current when the synchronous rectifier is disabled and also capable of blocking reverse current flow in the inductor. The power converter is initialized by enabling the synchronous rectifier. For example periodically, the synchronous rectifier is disabled. While the synchronous rectifier is disabled, the energy stored in the inductor is detected by sensing a voltage representing the energy stored in the inductor. A power level signal is generated by comparing the detected energy to a known energy level. The resulting signal has at least two predetermined values. The first predetermined value of the power level signal indicates that the power converter is operating at a power level above a threshold, and the second value selected indicates that the power converter is operating at a power level below the threshold. The power converter is then configured in response to the power level signal by enabling the synchronous rectifier if the power level signal is equal to the first predetermined value, and by disabling the synchronous rectifier if the power level signal is equal to the second predetermined value. The disabling step, detecting step, generating step, and configuring step are then repeated.

One important technical advantage of the present invention is that the disclosed method and apparatus allow a switched mode power converter equipped with a synchronous rectifier to sustain high efficiencies over wide load ranges. The invention disables the synchronous rectifier when the power level drops below a selected threshold so as to prevent inductor current backflow and the corresponding efficiency losses. The invention has a significant advantage over existing techniques as the disclosed method and apparatus are fully automatic and require no external control signals. The invention does not require additional current sense components and thus improves efficiency of the power supply. The use of the present voltage sensing technique makes the method and apparatus of the present invention significantly less sensitive to noise than existing current sensing techniques, thus providing another significant advantage of the invention over existing techniques. Other technical advantages of the disclosed invention will be apparent to those skilled in the art of designing power converter circuits.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention and its advantages are best understood by referring to FIGS. 1–10 of the drawings, like numerals being used for like and corresponding parts of the various drawings. For the purpose of understanding the present invention, the terms coupled, couples, etc. will refer to coupling between two elements by direct connection, magnetic coupling, or any other form of coupling. An element can be coupled to another element through other elements.

Figure 1:
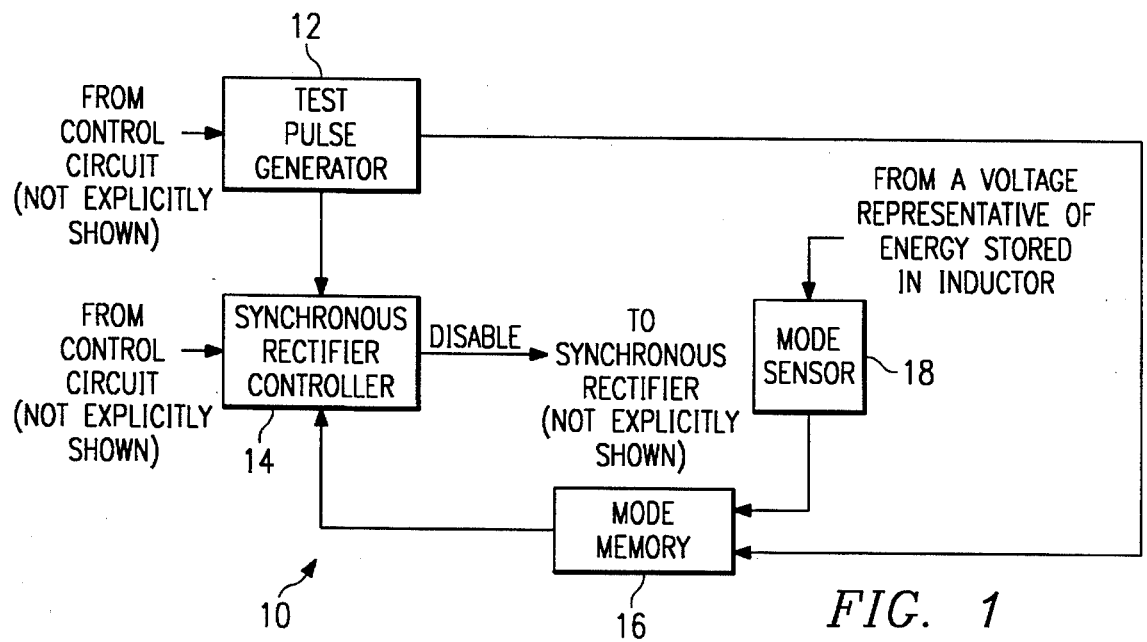
FIG. 1 illustrates a synchronous rectifier disabler circuit made in accordance with the teachings of the present invention and capable of performing the method of the present invention.

FIG. 1 illustrates a synchronous rectifier disabler circuit made in accordance with the teachings of the present invention. Disabler circuit 10 comprises test pulse generator 12, rectifier controller 14, mode memory 16, and mode sensor 18. Disabler circuit 10 may be; for example, an integrated circuit or a portion of an integrated circuit. Disabler circuit 10 is designed to be used with a switched mode power converter including at least one synchronous rectifier capable of being enabled or disabled, and coupled to an inductor. In some converters, multiple synchronous rectifiers may be associated with an inductor. The switched mode power converter normally has a control circuit to generate one or more cyclical switching signals to drive the externally controlled switches in the converter. When the synchronous rectifier is enabled, the control circuit turns the rectifier on and off in synchrony with another switch or switches. When the synchronous rectifier is disabled, it remains off regardless of the control circuit. A converter used with the present invention will also have at least one diode rectifier providing an alternate current path for the inductor current when the synchronous rectifier is disabled and also capable of blocking reverse current flow through the inductor.

The control circuit of the switched mode power converter is coupled to test pulse generator 12 and rectifier controller 14. Rectifier controller 14 is coupled to the synchronous rectifier and is capable of enabling or disabling the synchronous rectifier. Mode sensor 18 is coupled to the switched mode power converter so as to directly or indirectly measure the voltage across the inductor.

Test pulse generator 12 is coupled, by connection or otherwise, to mode memory 16 and rectifier controller 14. Rectifier controller 14 is coupled to mode memory 16. Mode memory 16 is coupled to mode sensor 18. Before describing in detail the operation of disabler circuit 10, the following discussion provides a brief description of its theory of operation.

As described in the Background of the Invention, switched mode power converters with diode rectifiers typically have two modes of operation, a continuous mode and a discontinuous mode. A switched mode power converter operates in continuous mode when power flowing through the inductor in question exceeds a critical threshold value, and operates in discontinuous mode when the power is lower than this threshold. When the power is exactly equal to this threshold, the converter is said to operate in nearly continuous mode.

Existing techniques for sensing power flow through the converter normally involve sensing current through a current sense resistor or transformer. The present invention uses a voltage sensing technique to determine when the converter is supplying low levels of power.

Because most synchronous rectifiers cannot block reverse current, a synchronous rectifier normally prevents the converter from entering discontinuous mode. If a diode rectifier is used instead of a synchronous rectifier, the onset of discontinuous mode can be detected by monitoring the voltage across the inductor during the portion of the switching cycle in which the first derivative of inductor current is negative (the off-time interval). If the power converter is operating in continuous mode, the inductor current will never fall to zero, and the diode rectifier will continue to conduct. The first derivative of inductor current accordingly remains negative and the inductor supports a voltage drop V=L di/dt where L is the inductance of the lumped inductor and di/dt is the first derivative of the inductor current with respect to time. If, on the other hand, the power converter is operating in discontinuous mode, then the inductor current will ramp down to zero, at which point the diode rectifier will act so as to block reverse conduction, and the value of di/dt will go to zero. The inductor will then be unable to support a voltage differential, leading to a sudden change in the voltage across the inductor. This voltage change can be sensed by measuring the differential voltage across the inductor, or any associated voltage. For example, one can measure the voltage across a winding magnetically coupled to the inductor, or any voltage or set of voltages from which the inductor differential voltage can be obtained by application of Kirchoff's Voltage Law. Accordingly, sensing this voltage at the end of an off-time interval can indicate whether the converter is operating in the discontinuous or continuous conduction mode.

Unfortunately, as noted above, a synchronous rectifier normally cannot block reverse current. When the synchronous rectifier is operating, the current through the inductor can decrease to zero and actually go negative at low power levels. The inductor di/dt will remain negative and the differential voltage across the inductor will not drop to zero. Therefore, this sensing technique will not work while the synchronous rectifier is operating.

It is thus impractical to employ the present invention while the synchronous rectifier is operating. However, the synchronous rectifier can be disabled occasionally at infrequent intervals. The rectifier could be disabled at random times or periodically after a specific plurality of cycles of the switching signal. The synchronous rectifier can be disabled, for example, for an entire cycle of the switching signal or less than an entire cycle of the switching signal. When the synchronous rectifier is disabled, a diode rectifier in the power converter provides an alternate current path for the inductor current. This rectifier should be capable of sustaining sufficient reverse bias voltage to allow it to block reverse current flow in the inductor. While the synchronous rectifier is disabled, the technique discussed directly above allows sensing the voltage across the inductor, thus allowing a determination of whether the converter is operating at a power level indicative of a continuous or discontinuous mode. If a low power level is detected, the synchronous rectifier can be disabled until another time interval has passed, which will prevent reverse conduction through the synchronous rectifier and the associated efficiency losses. Because the synchronous rectifier is only occasionally disabled, the efficiency benefits of synchronous rectification are largely retained for high power operation and the benefits of ordinary rectification can be obtained at low power levels.

The power flowing through an inductor in discontinuous mode can be determined by monitoring the voltage developed across the inductor. Consider an inductance L(I), which is a possibly nonlinear function of the current I through the inductor. If at time t=0, defined as the time when the inductor current is at a maximum, the inductor carries a current $I_o$, then the energy, $E_0$ stored in this inductor at time t=0 is:

$$E_o = \frac{1}{2} L(I_o) \cdot I_o^2 \quad (1)$$

If this inductor has an externally imposed voltage differential V(t) applied across it, V(t) possibly being a nonlinear function of time, then the following differential equation holds:

$$L(I) \cdot dI = V(t) \cdot dt \quad (2)$$

If the inductor is operating in discontinuous mode, and assuming that the inductor is discharged only once during each cycle of the converter's operation, then the time-averaged power flow associated with the inductor during one cycle of operation, $P_{avg}$, is:

$$P_{avg} = E_0/T \quad (3)$$

where T is the period of the converter, and it is understood that $P_{avg}$, $E_o$ and T are all possibly time-varying quantities. If there are multiple discontinuous mode discharge intervals in a single cycle of operation, the average power is then the summation of all such discharges divided by the period of the converter, or $$P_{avg} = \Sigma E_0/T \quad (4)$$

The above equations can be used to determine the power flow associated with the inductor, $P_{avg}$, in terms of a time, $t_d$, where $t_d$ is defined as the time required for the inductor current to discharge from $I_0$ to 0. Consider as an example the simplified case where L and V are invariant over the interval $0<t<t_d$ and there is only one discharge per period. Equation (2) can be integrated over the interval $0<t<t_d$ to form:

$$L \cdot I_o = V \cdot t_d \quad (5)$$

Substituting for $I_o$ in equation (1) gives:

$$E_o = \frac{1}{2} V^2 \cdot t_d^2 / L \quad (6)$$

And substituting equation (6) into equation (3) gives:

$$P_{avg} = \frac{1}{2} V^2 \cdot t_d^2 / (L \cdot T) \quad (7)$$

This equation shows that there is a relationship between the discharge time $t_d$ and the average power $P_{avg}$. In the most general case, a multidimensional nonlinear equation of the form $P_{avg} = f(t_{d1}, t_{d2}, t_{d3} \ldots)$ can be derived, which shows the dependence of $P_{avg}$ on each discharge interval in one cycle of converter operation. So long as the inductor discharges fully in each discharge interval, this equation applies.

The voltage across the inductor, V(t), will drop to zero at time $t=t_d$ because inductor current drops to zero and remains there, and di/dt thus goes to zero. Thus, by measuring V(t) at $t=t_m$, $t_m$ being an arbitrary measurement point relative to t=0, it is possible to determine if $t_d<t_m$, or $t_d>t_m$. Specifically, if $V(t) \approx 0$, then $t_d<t_m$; otherwise $t_d>t_m$. Because $P_{avg}$ is proportional to $t_d$ by equation 7, this amounts to a method by which it is possible to determine if $P_{avg}$ exceeds a threshold value, $P_m$ corresponding to $t_m$. Because $E_0$ is proportional to $P_{avg}$ by equation 3, this provides a method of determining if $E_0$ exceeds a threshold value, $E_m$ corresponding to $P_m$. Thus, by measuring the voltage across the inductor, it is possible to determine the average power flowing through the inductor, or equivalently, the energy stored in the inductor.

In order to disable the synchronous rectifiers to prevent efficiency losses in discontinuous mode, a threshold of power just below that required to sustain continuous conduction can be set. By infrequently disabling the synchronous rectifier and monitoring the inductor voltage, it is possible to determine whether the converter is operating at a power level above or below this threshold. If the converter is operating above this power threshold, the synchronous rectifier can be enabled. If the converter is operating below this power threshold, the synchronous rectifier can be disabled until the next time that the monitoring circuit examines the inductor voltage.

More generally, two thresholds Ph and Pl can be established, where Ph is somewhat larger than Pl, and the difference Ph–Pl represents a hysteresis margin. If the converter's synchronous rectifier(s) are disabled, then the power level detected by the monitor circuit must exceed Ph before they will be enabled. If the converter's synchronous rectifier(s) are enabled, then the power level detected by the monitor circuit must drop below Pl before they will be disabled.

The method and apparatus of the present invention allow the switched mode power converter to sustain efficiency over wide load ranges. In operation, the method involves initializing the power converter by enabling or disabling the synchronous rectifier. Occasionally, the synchronous rectifier is disabled. During the interval in which the synchronous rectifier is disabled, the energy stored in the inductor is detected by sensing a voltage representing the energy stored in the inductor. After the detecting step, a power level signal is generated having at least two possible values. The power level signal is generated by comparing the detected energy to a known energy level. A first value of the power level signal indicates that the power converter is operating at a power level above a certain threshold, while a second value of the power level signal indicates that the power converter is operating at a power level below the threshold. This threshold value can, for example, be a power level near the boundary between continuous and discontinuous operation of the power converter. In practice, as described below, the threshold will normally be slightly above the boundary between continuous and discontinuous operation.

After the power level signal has been generated, the power converter is configured in response to the power level signal by enabling the synchronous rectifier if the power level signal is equal to the first value, and disabling the synchronous rectifier if the power level signal is equal to the second value. For example, the power converter can be configured to enable the synchronous rectifier if the power level exceeds the aforementioned threshold, and disable the synchronous rectifier if the power level is lower than that threshold.

The steps of disabling the rectifier, detecting the energy stored in the inductor, generating a power level signal based on the energy stored in the inductor and configuring the power converter in response to the power level signal are then repeated.

This method can be implemented using disabler circuit 10 of FIG. 1, the structure which was described above. In operation, test pulse generator 12 receives the switching signal from the control circuit of the switched mode power converter and occasionally generates a test pulse in response to the switching signal. Various examples of circuits that can be used for test pulse generator 12 are described below.

Mode sensor 18 is coupled to the inductor and is operable to generate a power level signal having at least two possible values wherein the first value of the power signal indicates that the power converter is operating at a power level above a threshold and the second value of the power level signal indicates that the power converter is operating at a power level below the threshold. The power level signal is generated by sensing a voltage representative of the energy stored in the inductor and by comparing the detected energy represented by the voltage to a threshold energy value.

For example, in a buck converter, the mode sensor could sense the voltage at the cathode of the rectifier that provides the alternate path for inductor current when the synchronous rectifier is disabled. Alternatively, a voltage can be sensed in other ways such as by using a secondary winding on the inductor. Mode memory 16 is operable to sample and store the value of the power level signal in response to the test pulse. Mode memory 16 can also produce a memory output equivalent to the stored value. Although the power level signal could be sampled at any time during an off-period of a cycle of the switching signal, the power level signal will normally be sampled at a transition edge of the test pulse. Specifically, mode memory 16 will normally be constructed to sample the power level signal from mode sensor 18 at a transition edge of the test pulse that occurs at the end of an off-period of the switching signal or, as described below, a delayed transformation of the switching signal.

Rectifier controller 14 is operable to disable the synchronous rectifier in response to the test pulse and can be designed to disable the synchronous rectifier for the entire duration of the test pulse. Rectifier controller 14 is also operable to disable the synchronous rectifier in response to the switching signal in accordance with the normal operation of a power converter. A synchronous rectifier is normally switched off during the on-period of a switching cycle and switched on during the off-period of a switching cycle. Rectifier controller 14 is further operable to disable the synchronous rectifier when the memory output equals the second value of the power level signal. In other words, rectifier controller 14 disables the synchronous rectifier when the memory output indicates that the power converter is operating at a power level below a certain threshold.

The discussion below illustrates three embodiments of the present invention and their use with a buck type switched mode power converter. Although three embodiments are disclosed, other embodiments could be constructed in accordance with the teachings of the present invention. In addition, the method and apparatus of the present invention are useful with many types of power converter topologies other than the buck type switched mode power converter.

Figure 2:
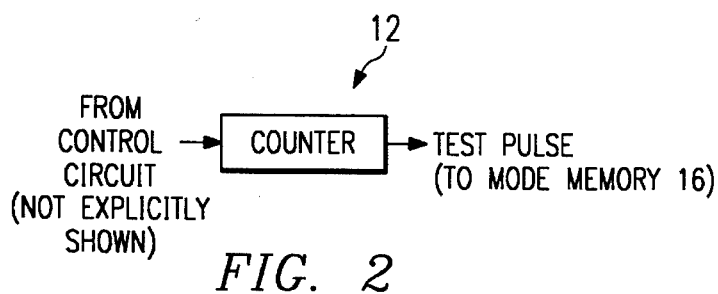
FIG. 2 illustrates a type of test pulse generator that can be used in the synchronous rectifier disabler circuit of FIG. 1.

FIG. 2 illustrates an embodiment of a test pulse generator 12 that can be used in disabler circuit 10 in accordance with the teachings of the present invention. This embodiment of test pulse generator 12 comprises a counter that counts N cycles of the switching signal as provided by the control circuit. On the Nth cycle, the counter generates a test pulse. The test pulse can, for example, have a duration equivalent to the duration of one cycle of the switching signal. The value of N could be hard wired into test pulse generator 12 or test pulse generator 12 could be programmable such that the user of disabler circuit 10 could provide the value of N for a specific application. Ordinarily, the value of N will be a large integer such that generator 12 only occasionally generates a test pulse.

Figure 3:
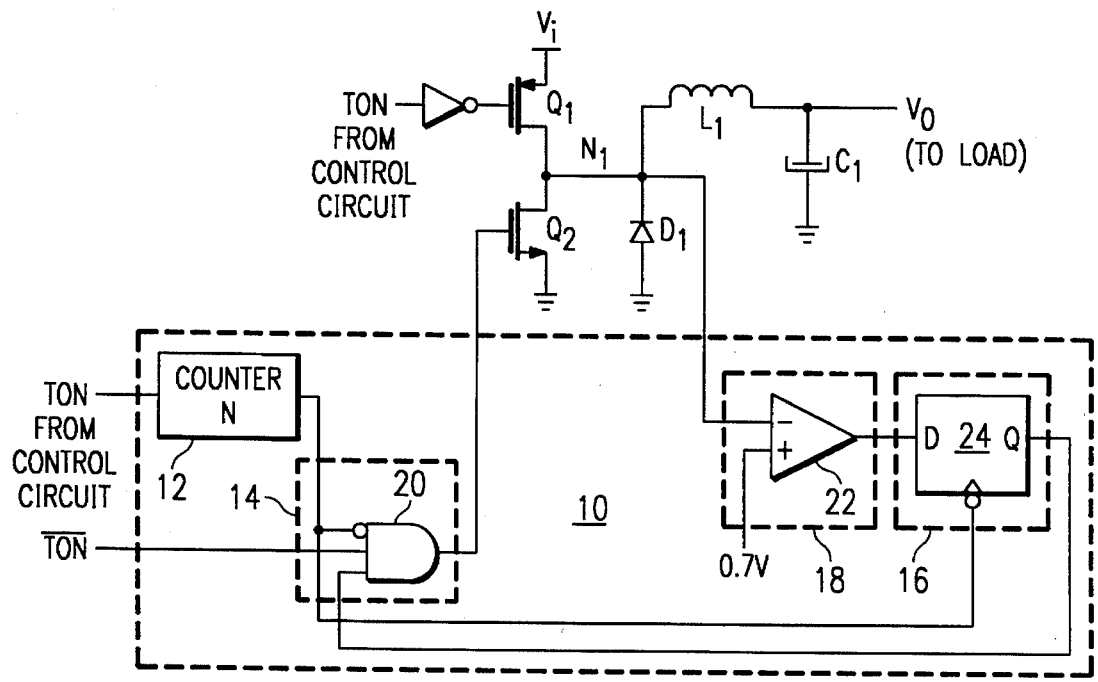
FIG. 3 illustrates an implementation of a synchronous rectifier disabler circuit made in accordance with the teachings of the present invention and used with a buck converter.

FIG. 3 illustrates an embodiment of a synchronous rectifier disabler circuit 10 structured (or arranged) in accordance with the teachings of the present invention. Test pulse generator 12 has the implementation of test pulse generator 12 illustrated in FIG. 2. Test pulse generator 12 counts N cycles of the switching signal, TON, and once in every N cycles, produces a test pulse that will normally have a duration equal to one cycle of the switching signal. This pulse is used to disable the synchronous rectifier, $Q_2$, for one cycle of operation via AND gate 20. In this embodiment, AND gate 20 serves as rectifier controller 14. Here, synchronous rectifier $Q_2$ may be an n-type MOSFET.

A portion of a representative buck converter is illustrated in FIG. 3. The input voltage is applied to the source lead of p-type MOSFET $Q_1$. The drain of $Q_1$ is connected to the drain of n-type MOSFET $Q_2$. The source of MOSFET $Q_2$ is grounded. A rectifier, $D_1$, is connected in parallel with synchronous rectifier $Q_2$ and serves as an alternate current path for inductor $L_1$ when synchronous rectifier $Q_2$ is disabled. The switching of transistor $Q_1$ and synchronous rectifier $Q_2$ are controlled by a control circuit (not explicitly shown) that produces a switching signal, TON. TON has an on-period and an off-period during each cycle of the switching signal. For the embodiment illustrated in FIG. 3, TON can represent a signal that is "high" when transistor $Q_1$ is turned on and "low" when transistor $Q_1$ is turned off. A feedback network (not explicitly shown) is normally connected to the buck converter and included in the control circuit, which allows the duty cycle of TON to be adjusted in response to the power level at which the converter is operating.

When synchronous rectifier $Q_2$ is disabled, fast comparator 22 monitors the cathode voltage at the cathode of rectifier $D_1$. Fast comparator 22 serves as mode sensor 18 depicted in FIG. 1. The output of the comparator is latched into flip-flop 24, which serves as mode memory 16 depicted in FIG. 1, on the transition edge of the test pulse provided by test pulse generator 12. In this embodiment, the output of comparator 22 serves as the power level signal that indicates whether the power converter is operating at a power level above or below a selected threshold. The power level is detected at the transition edge of the test pulse occurring approximately at the conclusion of an off-period of the switching signal.

The output of flip-flop 24 is coupled to AND gate 20 and disables the synchronous rectifier when the flip-flop output indicates that the power level has dropped below the selected threshold level.

The occasional disabling of the synchronous rectifier and insertion of the diode into the converter topology for one cycle of the switching signal disturbs the steady state continuous mode operation of the circuit. The losses induced by the insertion of the parallel diode disturb the average current level through the converter due to introduction of a volt-second imbalance. This effect will be gradually damped out over a period of several cycles of operation, and will cause output voltage ripple. Although such levels of output voltage ripple may be acceptable in some applications, other applications may require a more stable output voltage from the converter. In addition, the rectifier $D_1$ that takes over for synchronous rectifier $Q_2$ inserts a forward voltage drop which causes the inductor $L_1$ to discharge faster than it otherwise would. This change in di/dt causes an underestimation of the power level at which the converter is operating when in continuous mode. When the converter operates at a power level just above the boundary between continuous and discontinuous mode, this effect can cause synchronous rectifier disabler circuit 10 to erroneously disable the synchronous rectifier. The rectifier will be reenabled during a subsequent operation of disabler circuit 10, resulting in periodic transient disruptions of the converters power flow, leading to an additional amount of output voltage ripple.

Figure 4:
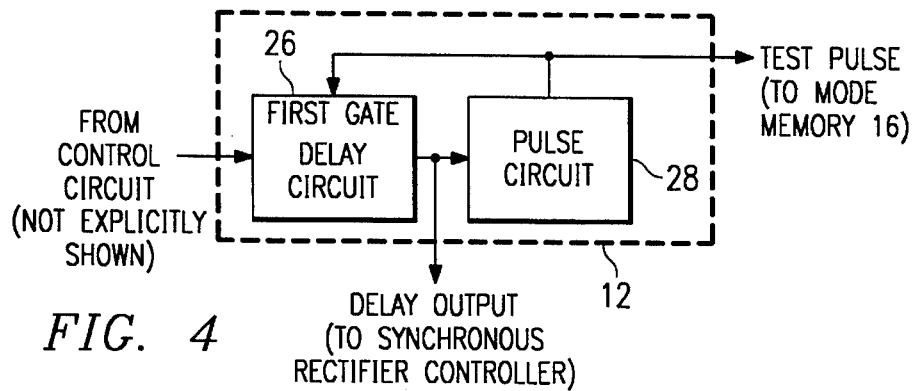
FIG. 4 illustrates an example of a test pulse generator which can be used with the synchronous rectifier disabler circuit of FIG. 1.

FIG. 4 illustrates a second embodiment of test pulse generator 12 that can be used in synchronous rectifier disabler circuit 10 to substantially reduce the voltage ripple produced when test pulse generator 12 illustrated in FIG. 2 is used. The embodiment illustrated in FIG. 4 includes delay circuit 26 coupled to pulse circuit 28. Some output voltage ripple in the circuit of FIG. 3 results from the volt-second imbalance caused by disabling synchronous rectifier $Q_2$ for an entire cycle of the switching signal. Because the imbalance is proportional to the length of the time during which the diode rectifier conducts instead of the synchronous rectifier, this ripple can be greatly reduced by disabling the synchronous rectifier for a negligibly small time interval when compared to the length of the off-period of one cycle of the switching signal. When the synchronous rectifier is disabled for a negligibly small time interval, the volt-second imbalance is proportionately small, the converter is not disturbed significantly from the steady state, and the power level sensing can be performed without disruption.

The embodiment of test pulse generator 12 illustrated in FIG. 4 satisfies this condition by imposing a delay in the switching signal. This delay is equivalent to a phase shift of duration $\Delta t$ imposed on the switching signal. A phase shift imposed over one cycle of the switching signal is nondisruptive to continuous mode operation when averaged over two cycles of operation.

The discharge time of any inductor in any continuous mode converter topology can be increased or decreased by an amount $\Delta t$ without affecting the general requirement of balanced volt-seconds, by phase-shifting the switching intervals such that the lengthening of one discharge period is exactly cancelled by the shortening of another discharge period. The volt-second imbalance inserted during the first cycle of operation is exactly cancelled by a volt-second imbalance of opposite polarity during the second cycle of operation. So long as the time constants of the control circuit are sufficiently long, the momentary volt-second imbalance generated by this technique will not cause transient disturbance of the converter's control loop.

The introduction of a phase shift $\Delta t$ into the converter's operating cycle is advantageous to the construction of a synchronous rectifier disabler. Assume that the phase shift is introduced at infrequent intervals, each of which only affects two cycles of operation, as discussed above. During the time $\Delta t$, the synchronous rectifier is disabled and the inductor voltage is monitored. If, at the end of time interval $\Delta t$, the voltage across the inductor is approximately zero, then the converter is operating below the power threshold. If, at the end of the time interval $\Delta t$, the voltage across the inductor is nonzero, then the converter is operating above the power threshold, $P_t$. The power threshold can now be adjusted by adjusting the length of time $\Delta t$. The relationship between power threshold $P_t$ and phase shift $\Delta t$ can be derived by use of equation (7). The average power flowing through the inductor in nearly-continuous mode, $P_{nc}$, is set by:

$$P_{nc} = \frac{1}{2} V^2 \cdot t_{dnc}^2 / (L \cdot T_{nc}) \qquad (8)$$

where V is the voltage seen across the inductor during the discharge interval, $t_{dnc}$ is the discharge interval in nearly discontinuous mode, and $T_{nc}$, which is the period of the converter cycle in nearly continuous mode $t_{dnc}$ and $T_{nc}$ may depend upon the control circuit's outputs, and are therefore not necessarily fixed values. The average power flowing through the inductor at the power threshold is:

$$P_t = \frac{1}{2} V^2 \cdot (t_{dnc} + \Delta t)^2 / (L \cdot T_{nc}) \qquad (9)$$

The length of the converter cycle is not significantly altered because the average power can be time-averaged over at least two cycles of operation to avoid disturbances caused by the volt-second balance inserted by $\Delta t$, as has been previously shown. The above formulas show that any desired threshold $P_t < P_{nc}$ can be set by proper selection of $\Delta t$. Although the above formulae assume a constant inductance L, formulae can be developed by extension of equations (1–6) which will handle the case of a current-dependent inductance L(I).

Figure 5:
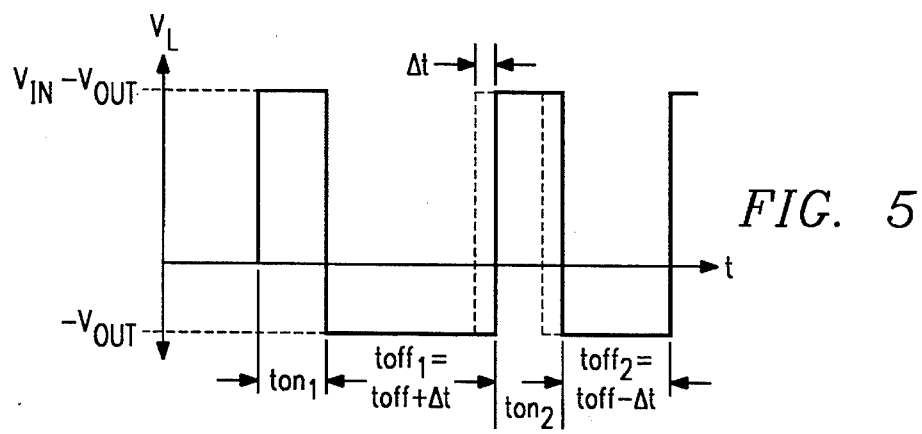
FIG. 5 illustrates a voltage wave form produced at a node of the circuit of FIG. 7, FIG. 9, or FIG. 10.

FIG. 5 illustrates the application of a phase shift $\Delta t$ to the switching signal, $t_{on}$, of a buck converter. In FIG. 5, a small delay is inserted into the off-period, $t_{off1}$ of one cycle of the switching signal. An adjacent cycle of the switching signal, in this case the cycle following the cycle with the extended off-period, has its off-period, $t_{off2}$, reduced by the same time, $\Delta t$. The dotted line of FIG. 5 illustrates what the wave form would look like without the inserted delay.

Figure 6:
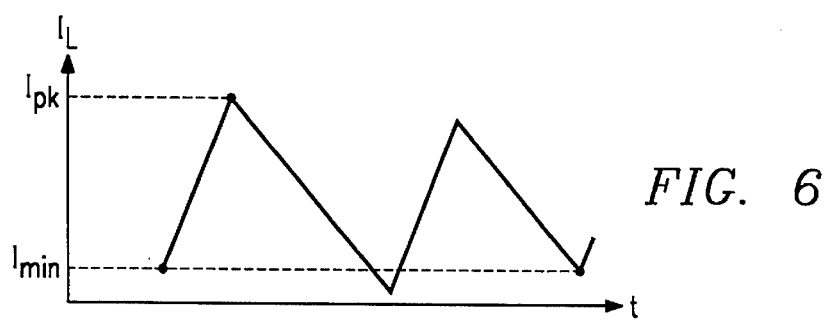
FIG. 6 illustrates an example of a current wave form that could occur in the inductor of FIG. 7, FIG. 9, or FIG. 10.

FIG. 6 illustrates an example of the current flowing through an inductor in a buck-type converter in response to the wave form of FIG. 5. As illustrated, the wave form of FIG. 5 disturbs the steady state operation of the converter for one cycle and the inductor returns to steady state operation at the end of the second cycle. Output voltage ripple is thus minimized.

Returning to FIG. 4, this embodiment of test pulse generator 12 can generate the appropriate delays in the switching signal to disable the synchronous rectifier during a short time interval, $\Delta t$, at the end of an off-period of one cycle of the switching signal. Delay circuit 26, which can, for example comprise a monostable multivibrator, inserts a small delay, $\Delta t$, in response to a first gate signal having a first enable value and a first disable value. Delay circuit 26 will delay the switching signal by an amount $\Delta t$ when the first gate signal has the first enable value. Otherwise, delay circuit 26 passes the switching signal to pulse circuit 28. The delay output is equal to the switching signal when delay circuit 26 is disabled, and equals the switching signal delayed by an amount $\Delta t$ when delay circuit 26 is enabled.

Because delay circuit 26 is normally enabled for a time equivalent to one cycle of a switching signal, it can produce a delay output having the off-period of one cycle of the switching signal increased by an amount $\Delta t$, and the off-period of an adjacent cycle of the switching signal reduced by an amount $\Delta t$. Pulse circuit 28 receives the delay output and generates a test pulse after counting N transitions of the delay output. Accordingly, pulse circuit 28 can be similar to the implementation of test pulse generator 12 illustrated in FIG. 2. The test pulse generated by pulse circuit 28 is normally equal in length to one cycle of the switching signal. The test pulse serves as the first gate signal for delay circuit 26, occasionally causing the delay, $\Delta t$, to be inserted into the switching signal for one cycle.

Figure 7:
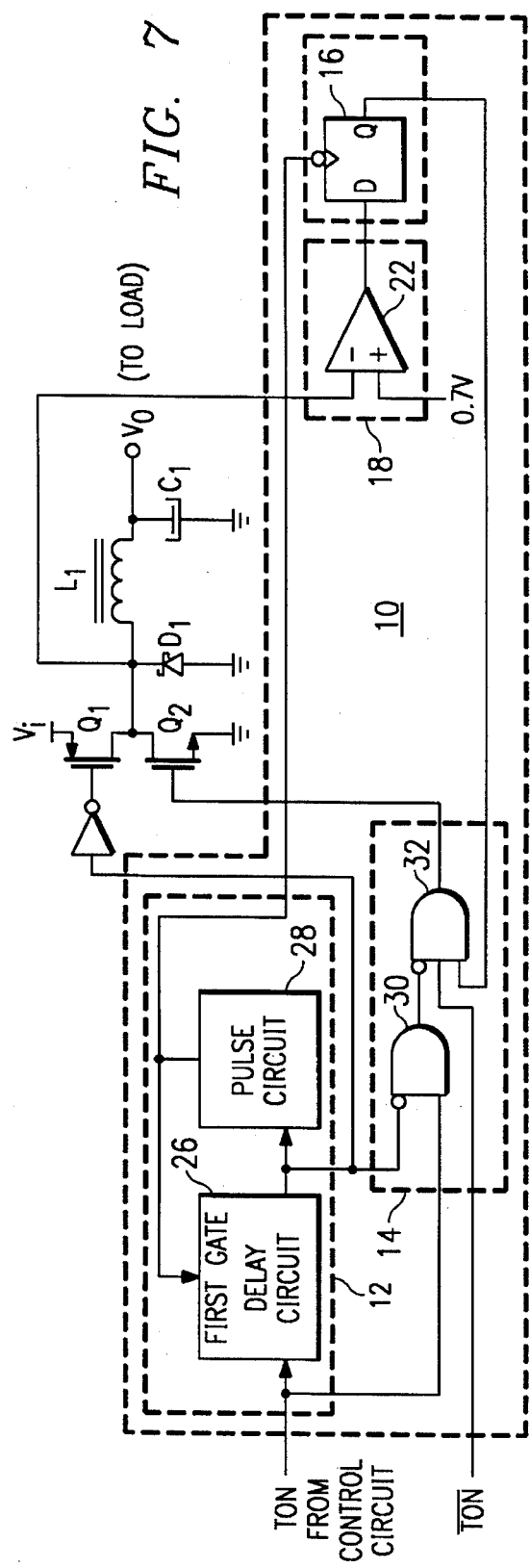
FIG. 7 illustrates another implementation of the synchronous rectifier disabler circuit of FIG. 1 used in a buck converter.

FIG. 7 illustrates a synchronous rectifier disabler circuit 10 attached to a buck type switched mode power converter and constructed in accordance with the teachings of the present invention. This embodiment of synchronous rectifier disabler circuit 10 includes test pulse generator 12 illustrated in FIG. 4.

In operation, delay circuit 26 inserts a time delay of length $\Delta t$ whenever the gate input is set to an enabling value. In the embodiment illustrated in FIG. 7, the enabling value is a high value. Alternatively, the pulse circuit 28 may be designed such that the enabling value is a low value. The first gate signal is normally generated by pulse circuit 28 and has a duration approximately equal to one cycle of the switching signal. In this embodiment, the pulse circuit 28 is clocked on the falling edge of the delay output, thus causing the test pulse signal to enable delay circuit 26 during the first off-period, $t_{off1}$, and the second on-period, $t_{off2}$, of the waveform illustrated in FIG. 5. Alternatively, test pulse generator 12 may be designed such that delay circuit 26 is enabled during different on and off periods of adjacent cycles of the switching signals.

Rectifier controller 14 comprises AND gate 30 and AND gate 32. AND gate 30 receives the switching signal and the delay output. The switching signal is coupled to an inverting input of AND gate 30. Similarly, the output of AND gate 30 is coupled to an inverting input of AND gate 32.

Because AND gate 30 receives the inverted switching signal and the delay output, it disables synchronous rectifier $Q_2$ during the time period, $\Delta t$, at the end of an off signal where a delay, $\Delta t$, has been inserted. Referring again to FIG. 5, AND gate 30 causes synchronous rectifier $Q_2$ to be disabled during the period $\Delta t$ illustrated in FIG. 5 at the end of off-period $t_{off1}$. In this way, synchronous rectifier $Q_2$ is disabled for the purpose of measuring the power level of the power converter for a very brief period.

Mode memory 16 samples the power level signal produced by mode sensor 18 at the transition edge of the test pulse generated by pulse circuit 28. In this embodiment, the transition edge of test pulse 28 occurs at the transition edge of the delay output. Mode memory 16 samples the power level signal generated by mode sensor 18 at the rising edge of the wave form illustrated in FIG. 5 occurring at the end of $t_{off1}$. As was the case for the circuit illustrated in FIG. 3, the synchronous rectifier disabler circuit 10 illustrated in FIG. 7 disables synchronous rectifier $Q_2$ during the on-period of each cycle of the switching signal and when mode memory 16 indicates that the power level in the converter has dropped below a certain threshold.

The power threshold at which disabler circuit 10 of FIG. 7 disables synchronous rectifier $Q_2$ is normally at a power level slightly above the boundary between continuous mode and discontinuous mode. The small delay, $\Delta t$, inserted into the off-period of a cycle of the switching signal causes an additional discharge of the inductor beyond that normally encountered in steady state. Accordingly, the power level of the converter will be momentarily reduced by this delay and will largely be recovered by the end of the next cycle of the switching signal. As a result, the synchronous rectifier disabler circuit will slightly underestimate the power passing through the converter and will normally disengage synchronous rectifier $Q_2$ just before crossing into discontinuous conduction. This does not cause an erroneous reading of the power level because the same time delay is introduced into the discontinuous mode of operation.

Figure 8:
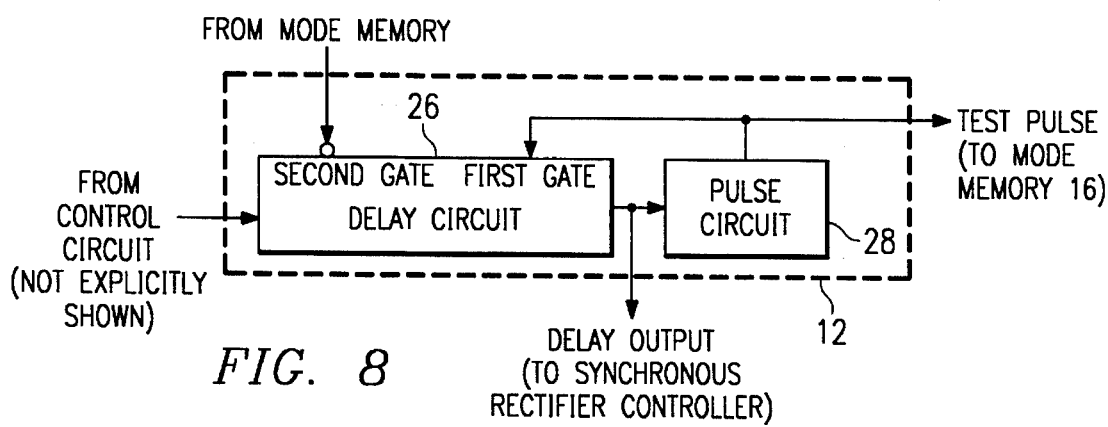
FIG. 8 illustrates an embodiment of a test pulse generator that could be used in the synchronous rectifier disabler circuit of FIG. 1.

FIG. 8 shows a third embodiment of test pulse generator 12 that can be used in accordance with the teachings of the present invention. This circuit introduces a hysteresis effect into the power threshold at which synchronous rectifier $Q_2$ is enabled or disabled. The transition from operating with synchronous rectification to operation with diode rectification, or vice versa, introduces a momentary transient produced by the volt-second imbalance caused by the forward voltage of the diode rectifier. The control circuit will compensate for this transient over a relatively long period of time. If the transient has not damped out by the time the mode detector is next operated, an erroneous power level signal may be detected, leading to additional transient disruptions. Introduction of hysteresis makes the circuit more tolerant of transient disruptions since the disruption must exceed the hysteresis margin in order to upset the converter's operation.

The embodiment of test pulse generator 12 illustrated in FIG. 8 adds an additional delay to an off-period of a cycle of the switching period when the synchronous rectifier $Q_2$ has been disabled by rectifier controller 14 in response to the output of mode memory 16. In other words, where mode sensor 18 has detected that the power level in the converter has dropped below a threshold and synchronous rectifier $Q_2$ has been disabled for more efficient operation, an additional delay is added to the next cycle in which mode memory 16 monitors the power level by reading the value output by mode sensor 18. This additional delay sets a power level threshold higher than that which caused synchronous rectifier disabler circuit 10 to disable synchronous rectifier $Q_2$. This hysteresis effect prevents synchronous rectifier $Q_2$ from being continually disabled and enabled when the power converter is operating near the boundary between continuous mode and discontinuous mode operation. Delay circuit 26 illustrated in FIG. 8 operates similarly to delay circuit 26 illustrated in FIG. 4. Delay circuit 26 adds a delay, in response to the first gate signal, to the switching signal received from the control circuit as described above. In this embodiment, however, a second gate signal is provided. The second gate signal adds an additional delay when both the first gate signal and second gate signal are enabled. The second gate signal has a second enable value and a second disable value similar to the first enable value and first disable value of the first gate signal. The second delay is inserted when the first gate signal is equal to the first enable value and the second gate signal is equal to the second enable value. Just as for delay circuit 26 of FIG. 4, the embodiment of delay circuit 26 illustrated in FIG. 8 adds these delays to the off-period of one cycle of the switching signal and reduces the off-period of an adjacent cycle of the switching signal by an equal amount.

Figure 9:
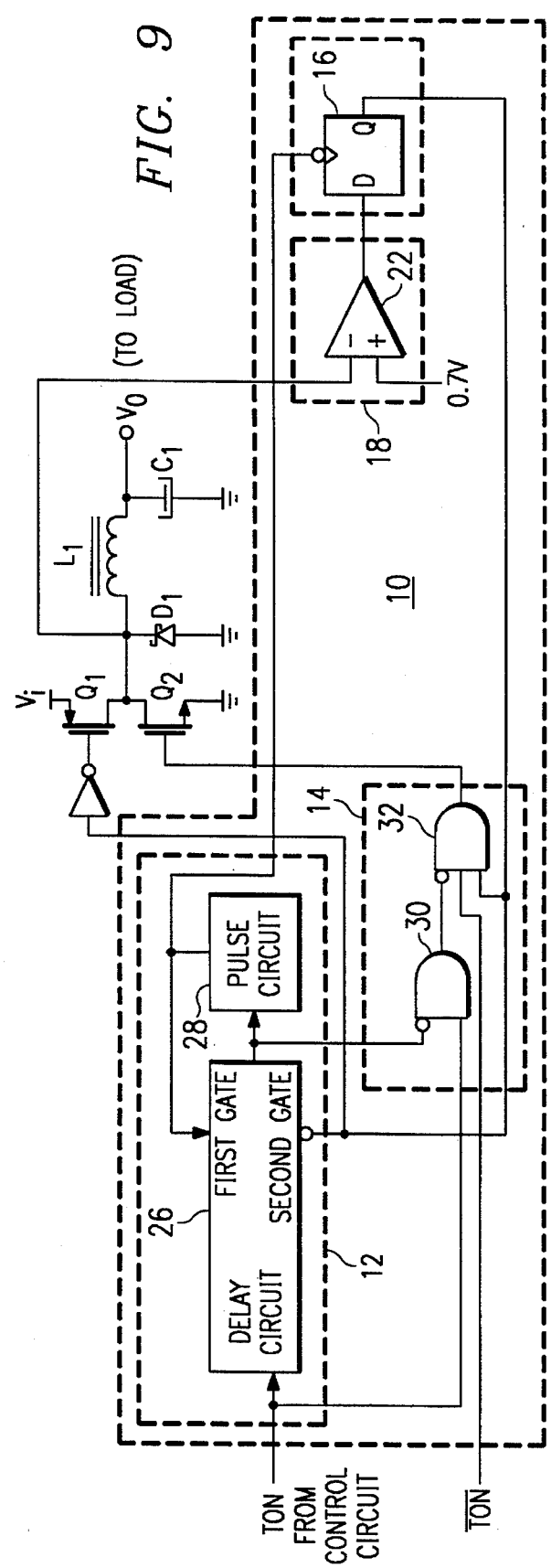
FIG. 9 illustrates another embodiment of a synchronous rectifier disabler circuit made in accordance with the teachings of the present invention and applied to a buck converter.

FIG. 9 illustrates disabler circuit 10 using the embodiment of test pulse generator 12 illustrated in FIG. 8 and connected to a buck type switched mode power converter. The components of disabler circuit 10 are connected to the power converter circuit just as they were connected in FIGS. 3 and 7. Delay circuit 26 here comprises two delay components in series which can include, for example, monostable multivibrators. The operation of disabler circuit 10 is similar to the operation of the embodiment of disabler circuit 10 illustrated in FIG. 7.

The difference in operation between the embodiment of disabler circuit 10 illustrated in FIG. 9 from the disabler circuit 10 illustrated in FIG. 7 concerns the second delay occasionally inserted by delay circuit 26 into the switching signal. When the output of mode memory 16 indicates that synchronous rectifier $Q_2$ should be enabled, the embodiment of disabler circuit 10 illustrated in FIG. 9 operates like the embodiment illustrated in FIG. 7. Synchronous rectifier $Q_2$ is occasionally disabled for a period equivalent to the first delay inserted by delay circuit 26. During the brief time that synchronous rectifier $Q_2$ is disabled, mode memory 16 tests the power level of the converter by storing the power level signal output by mode sensor 18.

However, when the output of mode memory 16 indicates that the power level of the converter has dropped below a threshold value and that synchronous rectifier $Q_2$ should be disabled until the next time that the power level is checked, the operation of this embodiment of disabler circuit 10 differs from the embodiment of FIG. 7. The output of mode memory 16 is provided as an inverting input to delay circuit 26 and serves as the second gate signal for delay circuit 26 of test pulse generator 12 as illustrated in FIG. 8.

Accordingly, the output of mode memory 16 can enable the second delay of delay circuit 26 when mode memory 16 indicates that synchronous rectifier $Q_2$ should be disabled. The output of mode memory 16 disables the second delay when the output of mode memory 16 indicates that synchronous rectifier $Q_2$ should be enabled. The second delay, however, is also connected to the first gate signal that enables the first delay. In this case, the test pulse output by pulse circuit 28 provides the first gate signal to delay circuit 26. The second delay will be inserted into the switching signal during the occurrence of the test pulse and while the output of the mode memory indicates that synchronous rectifier $Q_2$ should be disabled. This configuration has the effect of adding a second short delay to the switching signal when the synchronous rectifier has been previously disabled because the power level has dropped below the threshold amount. Adding a second delay has the effect of lengthening the delay period, $\Delta t$. For example, the delay period illustrated in FIG. 5 could be the sum of the delays controlled by the first gate signal and the second gate signal. The length of the delay $\Delta t$, will thus vary depending upon whether the synchronous rectifier was enabled or disabled before the operation of the test pulse generator. The variation of delay $\Delta t$ provides the desired hysteresis effect.

Figure 10:
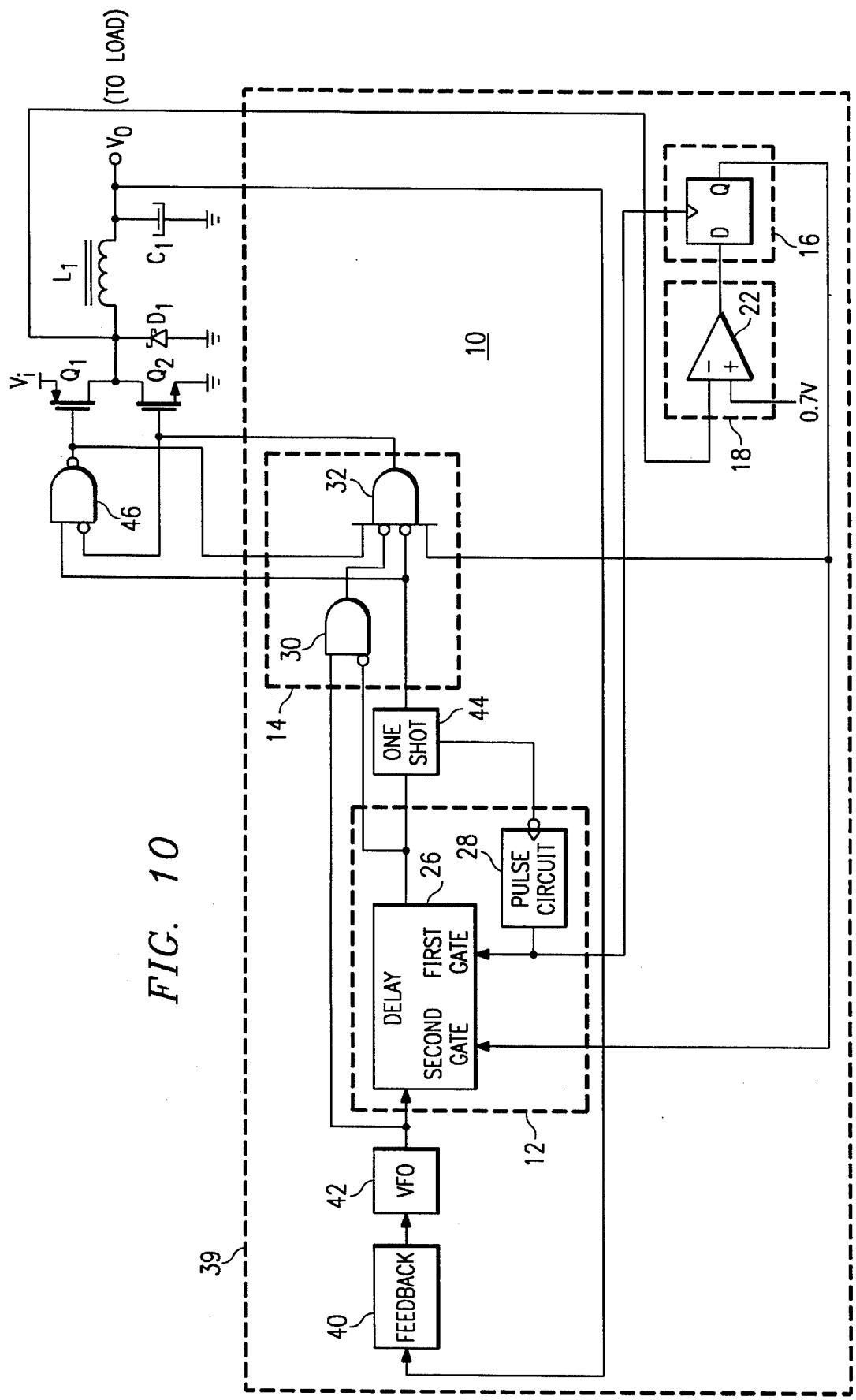
FIG. 10 illustrates another embodiment of a synchronous rectifier disabler circuit made in accordance with the teachings of the present invention and applied to a buck converter.

FIG. 10 illustrates disabler/control circuit 39 using the embodiment of test pulse generator 12 illustrated in FIG. 8 and connected to a buck type switched mode power converter. The operation of disabler/control circuit 39 is approximately the same as the operation of disabler circuit 10 illustrated in FIG. 9. Here, however, the functions of the control circuit and disabler circuit have been combined into a single switching/disabler circuit 39. Test pulse generator 12 has been incorporated directly into the control circuit in this implementation.

Mode memory 16 and mode sensor 18 are coupled to the converter just as they were in the embodiment illustrated in FIG. 9. Rectifier controller 14 is similar to rectifier controller 14 illustrated in FIG. 9. In this embodiment, however, an additional input has been added to AND gate 32 and the output of AND gate 32 is coupled to an inverting input of NAND gate 46. The output of NAND gate 46 is coupled to an input of AND gate 32. Those skilled in the art will recognize this as an anti shoot-through configuration which prevents $Q_1$ and $Q_2$ from conducting simultaneously.

The output of the converter is coupled to a feedback network 40, which couples to variable frequency oscillator 42. Variable frequency oscillator 42 couples to test pulse generator 12 which couples to one shot 44. One shot 44 couples to NAND gate 46 and rectifier controller 14.

Variable frequency oscillator 42 is a common variable frequency oscillator that produces a square wave train having a fifty percent duty cycle and a frequency that is proportional to a voltage supplied by feedback network 40. This frequency typically varies between 0 and approximately 150 kHz. One shot 44 generates a pulse each time it receives a rising edge from test pulse generator 12. The pulse has a period equal to the period of the square wave produced by the variable frequency oscillator. The on-time of the pulse is controlled by variations in the input voltage, $V_i$ as is commonly done in switched mode power converters to provide voltage feedforward correction. (The connection to the input voltage is not illustrated in FIG. 10.) The operation of disabler/control circuit 39, as is apparent, is identical in all material respects to the operation of the embodiment of disabler circuit 10 illustrated in FIG. 9. Other variations of this embodiment will be apparent to those skilled in the art.

The disclosed method and apparatus for enabling and disabling a synchronous rectifier in a switched mode power converter has many advantages. The invention enables and disables the synchronous rectifier automatically, allowing the switched mode power converter to maintain high efficiency over wide load ranges. The invention provides a fully automatic method and apparatus that require no external signals to determine when to enable or disable the synchronous rectifier. In addition, the method and apparatus of the present invention do not require the presence of an external sense resistor, or resistors, nor an external current sense transformer or transformers, thus avoiding the cost of these components and the dissipative losses created by their insertion. Because the present invention employs a voltage sensing technique rather than a current sensing technique, the disclosed rectifier disabler circuit is less sensitive to large noise transients that are invariably present in a switched mode power supply. Because the described circuitry is amendable to standard integrated circuit fabrication techniques, power supply designs may be more highly integrated and so may occupy less board space. Board layout is simplified due to reduced noise problems. This makes switched mode power converter design less expensive and much easier.

Although the present invention and its advantages have been described in detail, it should be understood that various changes, substitutions and alterations can be made therein without departing from the spirit and scope of the invention as defined by the appended claims.

What is claimed is:

1. A method for sustaining efficiency over wide load ranges in a switched-mode power converter including at least one synchronous rectifier capable of being enabled or disabled and coupled to an inductor, a control circuit operable to generate a cyclical switching signal having an on-period and an off-period during each cycle, and a diode rectifier operable to provide a path for the inductor current when the synchronous rectifier is disabled and block reverse current flow in the inductor, comprising the steps of:

initializing the power converter;

disabling the synchronous rectifier;

detecting the energy stored in the inductor while the synchronous rectifier is disabled by sensing a voltage representing the energy stored in the inductor;

generating a power level signal having at least two possible values by comparing the detected energy to a known energy level, wherein a first value of said at least two possible values indicates that the power converter is operating at a power level above a predetermined threshold and a second value of said at least two possible values indicates that the power converter is operating at a power level below the predetermined threshold;

configuring the power converter in response to the power level signal by enabling the synchronous rectifier if the power level signal is equal to the first value and by continuing to disable the synchronous rectifier if the power level signal is equal to the second value; and repeating said disabling step, said detecting step, said generating step and said configuring step.

2. The method of claim 1 wherein said disabling step further comprises the step of:

occasionally disabling the synchronous rectifier during approximately one off-period of the switching signal, corresponding to one discharge period of the inductor.

3. The method of claim 1 wherein said detecting step occurs near the conclusion of an off-period of the switching signal.

4. The method of claim 1 wherein said detecting step occurs near the conclusion of an off-period of the switching signal; and wherein said disabling step further comprises the step of occasionally disabling the synchronous rectifier during approximately one off-period of the switching signal.

5. The method of claim 1 wherein said disabling step further comprises the steps of:

occasionally extending the length of the off-period of a first cycle of the switching signal by a first duration; and disabling the synchronous rectifier during said first duration;

said method further comprising the step of:

reducing the length of the off-period of a second cycle of the switching signal by said first duration, wherein the second cycle is adjacent to the first cycle; and said repeating step further comprising the step of repeating said reducing step.

6. The method of claim 5 wherein said detecting step occurs near the conclusion of said first duration.

7. The method of claim 1 wherein said disabling step further comprises the steps of:

occasionally extending the length of the off-period of a first cycle of the switching signal by a first duration;

further extending the length of the off-period of the first cycle by a second duration if the synchronous rectifier was disabled during the cycle immediately preceding the first cycle;

disabling the synchronous rectifier during the duration that the off-period of the first cycle has been extended;

said method further comprising the steps of:

reducing the length of the off-period of a second cycle of the switching signal by the first duration, wherein the second cycle is adjacent to the first cycle;

further reducing the length of the off-period of the second cycle by the second duration if the synchronous rectifier was disabled during the cycle immediately preceding the first cycle; and wherein said repeating step further comprises repeating said reducing step and said further reducing step.

8. The method of claim 7 wherein said detecting step occurs near the conclusion of the duration that the off-period of the first cycle has been extended.

9. A synchronous rectifier disabler circuit for use with a switched-mode power converter including at least one synchronous rectifier capable of being enabled or disabled and coupled to an inductor, a control circuit operable to generate a cyclical switching signal having an on-period and an off-period during each cycle, the off-period corresponding to the discharge period of the inductor, and a diode rectifier operable to provide a current path for the inductor current when the synchronous rectifier is disabled and block reverse current flow in the inductor, comprising:

a test pulse generator coupled to the control circuit and operable to receive the switching signal and generate a test pulse in response to the switching signal;

a mode sensor coupled to the inductor and operable to generate a power level signal having at least two possible values wherein a first value of the power level signal indicates that the power converter is operating at a power level above a selected threshold and wherein a second value of the power level signal indicates that the power converter is operating at a power level below the selected threshold, the mode sensor further operable to generate the power level signal by sensing a voltage representative of the energy stored in the inductor and by comparing the energy stored in the inductor to a reference energy;

a mode memory coupled to said mode sensor and operable to sample and store the value of the power level signal in response to said test pulse and produce a memory output equivalent to the stored value; and a rectifier controller coupled to said test pulse generator, said mode memory, the control circuit, and the synchronous rectifier and operable to disable the synchronous rectifier in response to the test pulse, disable the synchronous rectifier in response to the switching signal, and disable the synchronous rectifier when said memory output equals the second value of the power level signal.

10. The synchronous rectifier disabler circuit of claim 9 wherein the test pulse generator is operable to generate the test pulse periodically after each occurrence of a fixed plurality of cycles of the switching signal.

11. The synchronous rectifier disabler circuit of claim 9 wherein said mode memory is operable to sample and store the value of the power level signal at a transition edge of said test pulse.

12. The synchronous rectifier disabler circuit of claim 9 wherein the test pulse generator is operable to generate a test pulse having a duration approximately equal to one cycle of the switching signal and wherein said rectifier controller is operable to disable the synchronous rectifier for the duration of the test pulse.

13. The synchronous rectifier disabler circuit of claim 9 wherein said test pulse generator further comprises:

a delay circuit coupled to the control circuit and responsive to a first gate signal having at least a first enable value and a first disable value, said delay circuit operable to produce a delay output comprising the switching signal when the first gate signal is equal to the first disable value, and comprising the switching signal delayed by a first duration when the first gate signal has the first enable value;

a pulse circuit coupled to said delay circuit and operable to receive the delay output and occasionally generate a test pulse in response thereto, wherein the test pulse comprises the first gate signal; and wherein said rectifier controller is also coupled to said delay circuit and operable to receive the delay output, wherein said rectifier controller is operable to disable the synchronous rectifier in response to the test pulse for the duration that the switching signal differs in value from the delay output during an off-period of the delay output.

14. The synchronous rectifier disabler circuit of claim 13 wherein said pulse circuit is operable to generate the test pulse periodically after each occurrence of a fixed plurality of cycles of the delay output.

15. The synchronous rectifier disabler circuit of claim 13 wherein said mode memory is operable to sample and store the value of the power level signal at a transition edge of said test pulse.

16. The synchronous rectifier disabler circuit of claim 9 wherein said test pulse generator further comprises:

a delay circuit coupled to the control circuit, responsive to a first gate signal having at least a first enable value and a first disable value, further responsive to a second gate signal having at least a second enable value and a second disable value and operable to produce a delay output comprising the switching signal when the first gate signal has the first disable value and comprising the switching signal delayed by a first duration when the first gate signal has the first enable value and the second gate signal has the second disable value, and comprising the switching signal delayed by a second duration when the first gate signal has the first enable value and the second gate signal has the second enable value;

a pulse circuit coupled to said delay circuit and operable to receive the delay output and occasionally generate a test pulse in response thereto and wherein the test pulse comprises the first gate signal;

wherein said memory output serves as the second gate signal; and wherein said rectifier controller is also coupled to said delay circuit and operable to receive the delay output and wherein said rectifier controller is operable to disable the synchronous rectifier in response to the test pulse for the duration that the switching signal differs in value from the delay output during an off-period of the delay output.

17. The synchronous rectifier disabler circuit of claim 16 wherein said pulse circuit is operable to generate the test pulse periodically after each occurrence of a fixed plurality of cycles of the delay output.

18. The synchronous rectifier disabler circuit of claim 16 wherein said mode memory is operable to sample and store the value of the power level signal at a transition edge of said test pulse.

19. The synchronous rectifier disabler circuit of claim 9 wherein said mode memory is a flip-flop that is operable to sample and store the value of the power level signal at a transition edge of said test pulse.

20. The synchronous rectifier disabler circuit of claim 9 wherein the test pulse generator comprises a counter that is operable to generate the test pulse periodically after each occurrence of a fixed plurality of cycles of the switching signal and wherein the test pulse has a duration approximately equal to the duration of one cycle of the switching signal.

* * * * *